INVENTOR
WILBERT P. FRANTZ

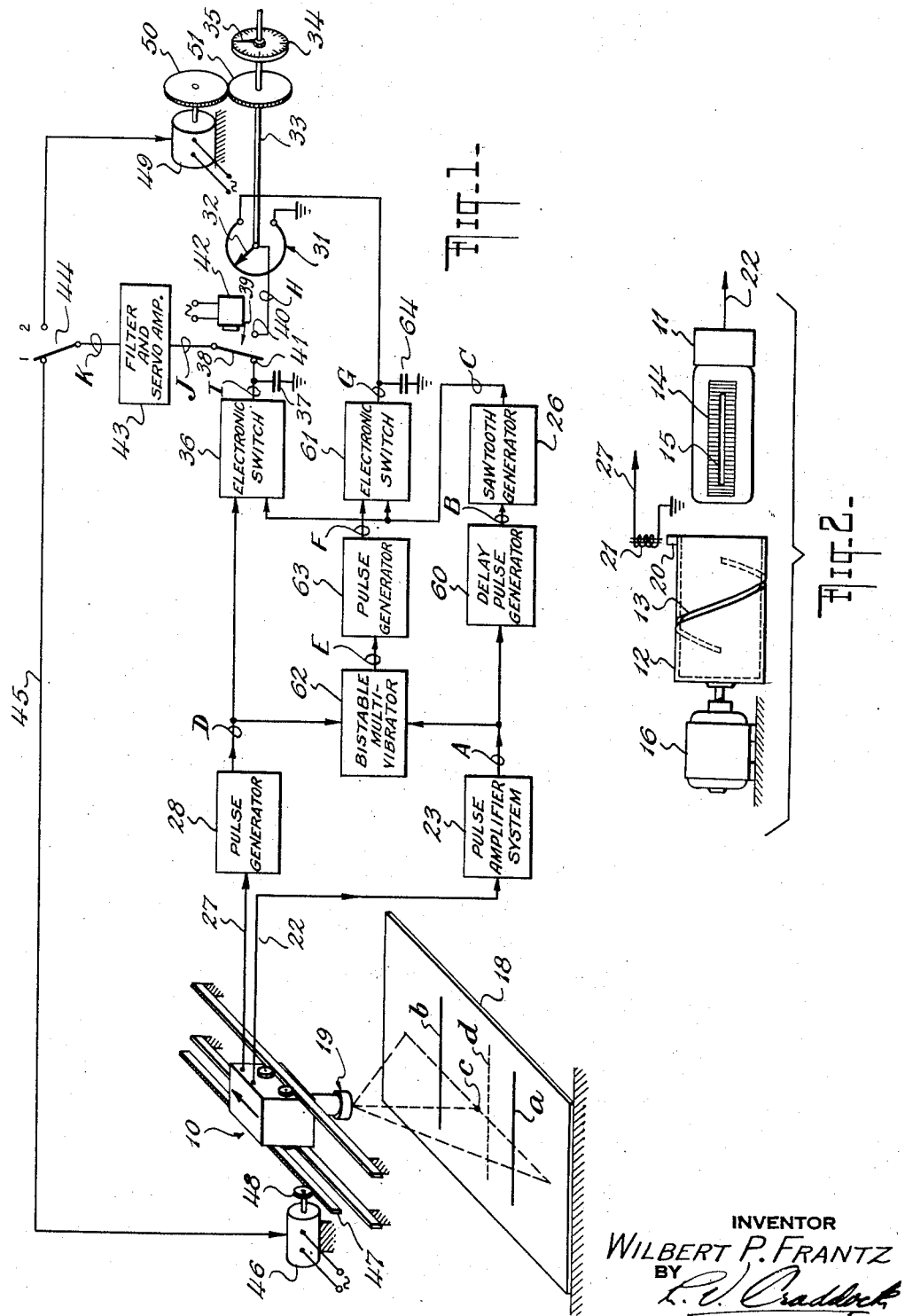

United States Patent Office 2,892,948
Patented June 30, 1959

2,892,948
POSITIONAL CONTROL SYSTEM FOR PHOTOSCANNER

Wilbert P. Frantz, Great Neck, N.Y., assignor to Sperry Rand Corporation, a corporation of Delaware Application April 10, 1956, Serial No. 577,401

20 Claims. (Cl. 250—202)

The invention relates to scanning systems, and in particular to a photoscanning system for scanning a chart and for automatically positioning the photoscanner with respect to the chart by comparing information derived while scanning with supplied positional data. This application is a continuation-in-part of application Serial No. 534,731, filed September 15, 1955, and abandoned on March 28, 1957.

In employing certain navigation systems, such as the loran system, to navigate a craft, special charts of the area in which the craft is to be navigated are required. These charts display both a map of the area and families of hyperbolic lines of position associated with the area. These hyperbolic or loran lines of position are lines of constant time difference between the arrival of first recurrent pulses from a master station and second recurrent pulses from a slave station and each loran line is numbered according to the corresponding time difference. The intersection of a first line of position from one pair of transmitting stations and a second line of position from another pair of transmitting stations establishes a navigational fix on the chart. The loran receiver measures the time differences between the arrivals of pulses from first and second pairs of stations, and the intersection of the lines of position on the loran chart corresponding to the measured time differences establishes the craft's position.

The number of loran lines of position on a chart is determined by the size of the chart and the interval of time difference desired between adjacent lines of position. Standard loran charts are printed in which the time difference interval between adjacent lines of position may be 20, 50, 100 microseconds. Where the time differences measured by the loran receiver do not coincide with an intersection of the printed loran lines of position on the chart, it is necessary for the operator or navigator to locate the craft's position by interpolating between adjacent lines of position. As the position of the craft changes, different loran time difference measurements are obtained from the loran receiver and new interpolations must be made. This interpolation process is both tedious and time consuming, and results in the possibility of human error in determining the position of the craft especially if the position of the craft is changing rapidly and many measurements of time differences and many interpolations are required.

A pictorial indicator automatically indicating the position of the craft on a map at all times operating together with an automatic plotter for displaying the track of the craft on the map would greatly relieve the burden of the navigator and enhance the accuracy and utility of the loran navigation system. To develop such an automatic loran craft position plotter, it is necessary to solve the problem of moving an object representing the craft over the surface of a chart and automatically positioning the object with respect to the lines on the chart when the craft's position corresponds to a position between the lines. The present invention is concerned with a solution to this problem.

A principal object of this invention is to provide apparatus for automatically interpolating between two spaced lines on a chart.

Another object of the invention is to automatically position an object with respect to navigational lines of position on a chart in accordance with supplied navigational data.

Yet another object of the invention is to automatically move a photoscanner while scanning lines on a chart to a predetermined position between two selected lines on a chart in accordance with supplied navigational data.

Another object of the invention is to automatically control the angular position of a shaft in accordance with the position of the center of scan of a photoscanner.

Still another object of the invention is to produce an output voltage whose magnitude is related to the distance between a line of position on a chart and an imaginary line representing craft position.

A further object is to produce an output voltage whose magnitude is related to the distance between the center of scan of a photoscanner transversely scanning first and second lines on a chart and a predetermined position between the lines being scanned.

An additional object is to provide a photo-scanner producing recurrent output reference pulses whose time position corresponds to the center of scan of the scanner.

In accordance with the present invention there is introduced a scanning system including a photoscanner for transversely scanning first and second lines on a chart. A first direct voltage is produced by said scanning system whose magnitude varies according to the distance between the first and second lines being scanned as measured along the line of scan. This first direct voltage is supplied to a voltage divider whose division is determined by input data representing a predetermined line of position on the chart between the first and second lines being scanned. The voltage divider produces a second output voltage whose magnitude represents the distance between one of the lines on the chart being scanned and an imaginary line on the chart corresponding to the predetermined line of position as controlled by the input data. A third direct voltage is produced by the scanning system whose magnitude varies according to the distance between the center of scan of the photoscanner and one of the lines on the chart being scanned. A voltage comparator responsive to the difference between the second and third output voltages is employed to energize a servomotor to vary the position of the photoscanner along its direction of scan until the center of scan of the photoscanner coincides with the imaginary line on the chart between the first and second lines.

In an alternative embodiment of the invention, the difference voltage from the voltage comparator is supplied to a servomotor coupled to the shaft of a potentiometer used as the voltage divider which produces the second direct output voltage. The servomotor automatically varies the angular position of the shaft of the potentiometer until the magnitude of the second direct voltage equals the magnitude of the third direct voltage. Under this condition, the angular position of the shaft corresponds to the position of the center of scan of the photoscanner with respect to the lines being scanned.

The above objects of and the brief introduction to the present invention will be more fully understood and further objects and advantages will become apparent from a study of the following detailed description in connection with the drawings, wherein:

Fig. 1 is a block diagram of the scanning and positional control system of the present invention;

Fig. 2 is an exploded view of the photoscanner showing the phototube with an apertured mask covering the opening to the photosensitive cathode and the magnetic pickoff for producing the center of scan pulses.

Figure 3:
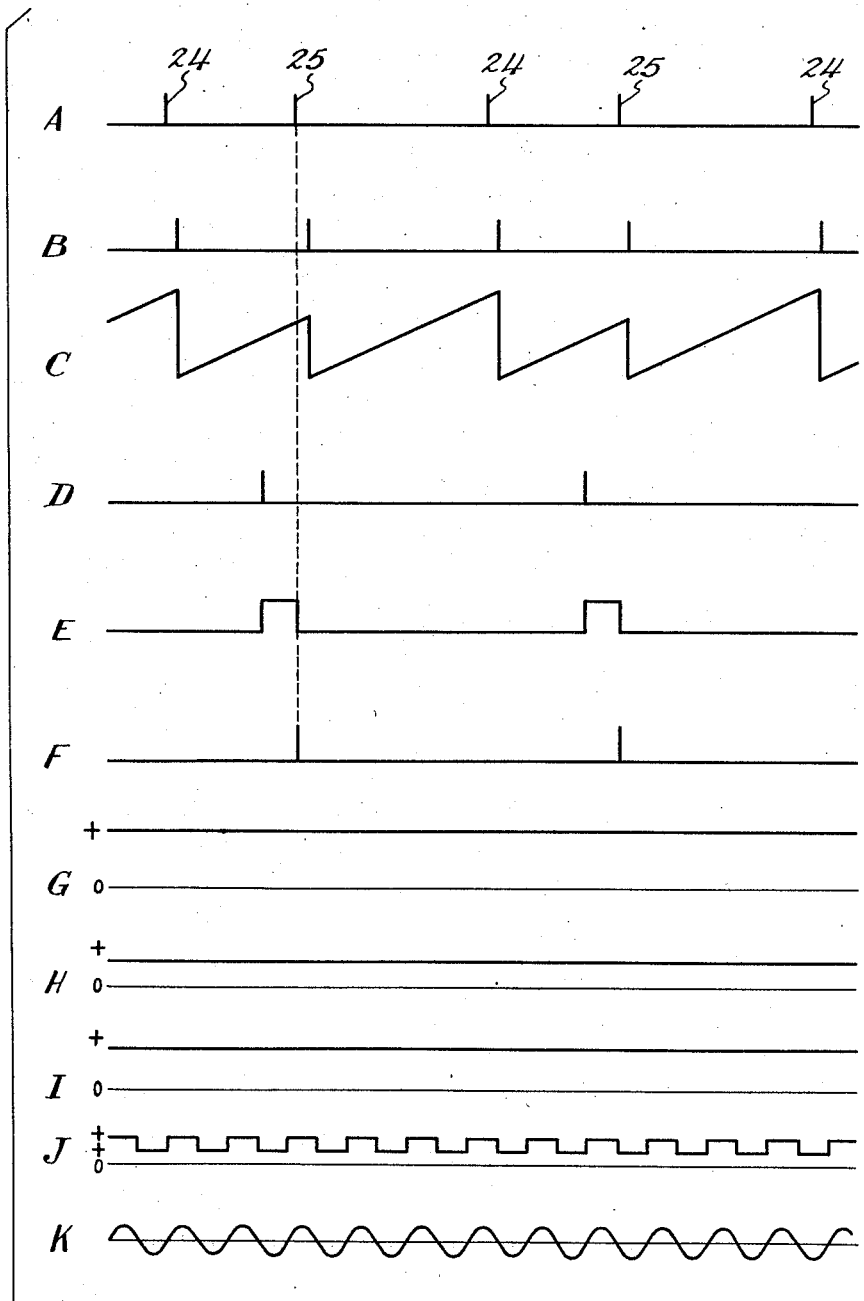
Fig. 3 illustrates waveforms of voltages associated with the block diagram of Fig. 1.

Referring to Fig. 1, a photoscanner 10 situated above chart 18 transversely scans the lines $a$ and $b$. The photoscanner includes a phototube 11 whose photocathode is covered with a mask 14 having a long narrow aperture 15 extending parallel to the longitudinal axis of the phototube, as shown in the exploded view of Fig. 2. The phototube 11 with mask 14 is situated within a hollow cylindrical drum 12 which has a one turn helical slit 13 in the wall thereof. Light is admitted to the photocathode only through the very small opening defined by the intersection of the narrow helical slit 13 and the narrow aperture 15 in mask 14. The cylindrical drum is rotated at a constant angular velocity by motor 16 to provide photoscanning along a straight line extending parallel to the longitudinal axis of the cylindrical drum. The image of lines $a$ and $b$ is focused upon the photocathode of tube 11 by a lens 19. The photoscanner 10 is similar to the scanner shown in application Serial No. 473,249, filed December 6, 1954, in the name of Roger B. Williams, Jr., entitled "Pulse Amplitude Equalizing System," and assigned to the same assignee as the present invention.

A magnetic tab 20 is attached to the outside wall of the cylindrical drum 12 at a position thereon corresponding to the center of scan of the photoscanner. As the cylindrical drum rotates at a constant angular velocity, the magnetic tab 20 revolves past a pickup coil 21 and induces a pulse voltage across the terminals thereof whose time position occurs at the center of scan.

As photoscanner 10 transversely scans lines $a$ and $b$, the phototube 11 produces recurrent output pulses on lead 22 corresponding to the lines being scanned. These pulses are amplified and shaped in pulse amplifier system 23 to produce recurrent output pulses of waveform A, illustrated in Fig. 3, in a manner substantially identical to that shown and described in the aforesaid pending application S.N. 473,249. The time difference between the recurrent pulses of waveform A varies according to the distance between lines $a$ and $b$ as measured along the line of scan. Thus, the time difference between the recurrent pulses identified as 24, corresponding to the line $a$, and the recurrent pulses 25, corresponding to the line $b$, varies according to the distance between these lines.

Photoscanner 10 is arranged to scan at least a total distance equal to twice the spacing between the lines, as measured along the line of scan. The lines $a$ and $b$ do not have to be parallel nor are they limited to straight lines. More than the two lines shown may be scanned if desired.

The recurrent pulses of waveform A are coupled to a delay pulse generator 60 to produce the delayed output pulses of waveform B. These pulses are delayed only slightly from the pulses of waveform A. The delayed pulses of waveform B are applied to a sawtooth generator 26 for producing a linear sawtooth voltage wave of waveform C. This linear sawtooth voltage wave has peak values corresponding to the time interval between successive pulses. Accordingly, the peak value of the linear sawtooth voltage cycle generated between the pulses 24 and 25 varies according to the distance between the lines $a$ and $b$, as measured along the line of scan. The sawtooth voltage wave of waveform C is coupled to a pair of electronic switches 36 and 61.

The center of scan pulses induced in pickup coil 21 are coupled over lead 27 to a pulse generator 28 which shapes the center of scan pulses to produce recurrent narrow gating pulses of waveform D. These center of scan pulses occur once each revolution of the photoscanner. The center of scan pulses of waveform D are coupled to electronic switch 36.

Both the recurrent pulses of waveform A and the center of scan pulses of waveform D are coupled to a bistable multivibrator 62. The center of scan pulses activate or turn on the multivibrator, which is turned off by the first pulse of waveform A immediately following each activation of the pulse selector. In other words, multivibrator 62 is activated to produce a rectangular output voltage whose leading edges coincide with the recurrent center of scan pulses of waveform D and whose trailing edges coincide with the first pulses of waveform A. The rectangular output voltage from multivibrator 62 appears as waveform E in Fig. 3, and is supplied to a pulse generator 63 to produce recurrent output pulses whose time of occurrence coincides with the trailing edges of the rectangular voltage. Thus, the combination of bistable multivibrator 62 and pulse generator 63 constitute a pulse selector which operates to select and produce a pulse train as in waveform F simultaneously with the first pulses of waveform A following the pulses of waveform D. The recurrent output pulses from pulse generator 63 are supplied to activate electronic switch 61.

Electronic switch 61 is recurrently activated by the pulses of waveform F to periodically sample the magnitude of the linear sawtooth voltage wave. Electronic switch 61 charges condenser 64 to the instantaneous value of the sawtooth voltage wave at the instant of occurrence of the pulses of waveform F. Condenser 64 is charged to a voltage equal to the peak value of the sawtooth voltage cycle generated during the interval between pulses 24 and 25 of waveform A. Thus, condenser 64 produces a first direct output voltage of waveform G whose magnitude represents the distance between lines $a$ and $b$ as measured along the line of scan. This first direct voltage is coupled to a linear potentiometer voltage divider 31. Potentiometer 31 may be of the continuously rotatable type. A second direct output voltage of waveform H is produced at the arm 32 of potentiometer 31, of a magnitude determined by the setting or angular position of shaft 33.

Electronic switch 36 is recurrently activated by the center of scan pulses of waveform D to periodically sample the magnitude of the linear sawtooth voltage wave. Electronic switch 36 charges condenser 37 to the instantaneous value of the sawtooth voltage at the instant of occurrence of the center of scan pulses. Condenser 37 produces a third direct output voltage of waveform I whose magnitude represents the distance between line $a$ on the chart and the position $c$ on the chart corresponding to the center of photoscanner 10.

The magnitude of the second direct output voltage of waveform H represents a predetermined percentage of the value of the first direct voltage of waveform G as determined by the setting of the shaft 33. A dial 34 and pointer 35 coupled to shaft 33 may be calibrated in terms of percent of angular rotation of shaft 33 such that when potentiometer 31 produces a second output voltage whose magnitude is equal to the magnitude of the first direct voltage the dial 34 indicates 100 percent. When potentiometer 31 produces zero output voltage, the dial 34 indicates zero percent. Thus, where the linear potentiometer 31 is of the continuously rotatable type, one turn of shaft 33 represents 100% of the magnitude of the first direct output voltage of waveform G. Accordingly, one turn of shaft 33 may be considered as representing the distance between lines $a$ and $b$ on chart 18 as measured along the line of scan, and this relation is maintained regardless of the spacing between these lines.

An error control voltage whose magnitude varies according to the difference between the second direct voltage of waveform H and the third direct voltage of waveform I is produced for controlling the position of photoscanner 10 along its direction of scan with respect to lines $a$ and $b$. This error control voltage is obtained from the movable contact 38 of relay comparator 39. The second direct voltage is supplied to fixed contact 40 of relay 39 and the third direct voltage is supplied to fixed contact 41. The movable contact 38 alternates between contacts 40 and 41 at the frequency of the alternating switching voltage supplied to relay winding 42. For the condition when the magnitude of the third direct voltage exceeds the magnitude of the second direct voltage, the voltage at movable contact 38 appears as waveform J of Fig. 3. This voltage is coupled to the filter and servo amplifier 43 to produce the sinusoidal error control voltage of waveform K. The phase of this error control voltage is determined by the larger of the second and third direct voltages and the amplitude is determined by the difference between the second and third direct voltages.

The error control voltage is coupled through position 1 of switch 44 and over lead 45 to a servomotor 46. An alternating voltage from the same source as the alternating switching voltage is supplied as a reference voltage to servomotor 46. The error control voltage of waveform K energizes servomotor 46 to drive the position of photoscanner 10 along its direction of scan through rack 47 and pinion 48 until the error control voltage reduces to zero.

The position occupied by the photoscanner with respect to lines $a$ and $b$ when the error control voltage of waveform K has been reduced to zero is determined by the angular position of shaft 33. A setting of shaft 33 to an angular position corresponding to one-quarter or 25 percent of one turn sets the value of the second direct voltage of waveform H at 25 percent of the magnitude of the first direct voltage of waveform G. The magnitude of the second direct voltage thus corresponds to a distance equal to 25 percent of the total distance between lines $a$ and $b$ as measured along the line of scan relative to line $a$. Accordingly, the setting or angular position of shaft 33 as read from dial 34 corresponds to an imaginary line $d$ on chart 18. Thus, the position $c$ corresponding to the center of scan of photoscanner 10 can be automatically moved by the servo control system to correspond to any position between the lines $a$ and $b$, such as line $d$, as determined by shaft 33. In other words, the position $c$ corresponding to the center of scan of the photoscanner 10 can be automatically adjusted under the control of shaft 33 to interpolate by any selected percentage on dial 34 a predetermined position situated between lines $a$ and $b$, and this interpolated position is independent of the distance between lines $a$ and $b$.

The photoscanning system of Fig. 1 may be arranged to interpolate between adjacent pairs of loran lines of position where the lines $a$ and $b$ on chart 18 represent the loran lines between which a craft is located. Where these loran lines are spaced apart by a distance corresponding to a certain fixed time difference interval, for example 100 microseconds, the shaft 33 must be properly geared and indexed to the input data representing the measured loran number or time difference so that one revolution of shaft 33 corresponds to a change in time difference of 100 microseconds. A direct reading loran receiver such as the Mark II loran manufactured by the Sperry Gyroscope Company Division of the Sperry Rand Corporation indicates the measured time difference between the arrival of master and slave pulses as a number on a mechanically driven revolution counter. Accordingly, the mechanical shaft driving this revolution counter may be coupled through appropriate gearing so that a 100 microsecond change in the time difference as read on the revolution counter corresponds to one turn of shaft 33. For example, assume that the position of a craft to be navigated by means of the loran system is situated between two adjacent lines of position, one line corresponding to a time difference of 2600 microseconds and the other line corresponding to 2700 microseconds.

Where line $a$ on chart 18 corresponds to the loran line representing 2600 microseconds when the angular position of shaft 33 indicates zero percent and line $b$ corresponds to the loran line representing 2700 microseconds when the angular position of shaft 33 indicates 100 percent, any intermediate angular position of shaft 33 corresponding to the position of the craft between the two loran lines establishes an imaginary predetermined line of position on chart 18 to which the center of scan of the photoscanner will be automatically moved. Thus, the position of the center of scan $c$ with respect to chart 18 represents the position of the craft between the loran lines.

Where it is desired to produce a shaft position corresponding to a position on chart 18 between lines $a$ and $b$ to which the center of scan of photoscanner 10 already has been positioned, a second servo control system including servomotor 49 has been provided. The error control voltage of waveform K is coupled through position 2 of switch 44 to energize servomotor 49 to drive shaft 33 through gears 50 and 51 to an angular position representing the position of photoscanner 10. Servomotor 49 is supplied with a reference voltage from the same source as the reference voltage to servomotor 46. Under this alternative embodiment of the invention, input data from a loran receiver is not supplied to shaft 33 since the shaft now represents output data rather than input data.

The present invention is not limited in its application to a loran navigation system but may be used where an automatic interpolation device is desired to automatically interpolate between first and second spaced lines or points. The invention is not limited to the use of a photoscanner. Any type of scanner which produces recurrent output pulses from lines being scanned may be employed. Furthermore, magnetic tab 20 need not be attached to a point on the circumference of drum 12 where a pulse is produced corresponding to the center of scan. The pulse produced by magnetic tab 20 merely defines a reference point along the path scanned by the photoscanner. Thus, the reference pulse may be generated before or after the center of scan. In such case, point $c$ in Fig. 1 will be a point fixed with respect to the photoscanner that will automatically follow the imaginary line $d$, which corresponds to the position of the craft with respect to the area.

The reference pulse defining a point along the scan path may be generated by means other than a magnetic tab. Thus any resistive, capacitive or magnetic pick-off fixed with respect to drum 12 might be utilized.

Where more than two lines are scanned it is not necessary that these lines be spaced equi-distant along the scanned path. In any instance, the first direct voltage produced by condenser 64 is proportional to and dependent only on the distance between the lines which bound the space in which interpolation is desired. The action of the pulse selector insures that this voltage is not affected by non-uniformity in the spacing of the lines being scanned.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for automatically moving the position of a scanner with respect to a predetermined position located between first and second lines on a chart, said scanner transversely scanning said first and second lines at a constant scanning speed and producing first recurrent output pulses corresponding to the lines being scanned, the time between said recurrent output pulses varying according to the distance between said lines as measured along the line of scan, said scanner further producing second recurrent output pulses whose time position occurs at the center of each scanning cycle, comprising in combination, means including a sawtooth generator means coupled to said scanner and responsive to said first recurrent pulse for producing a linear sawtooth output voltage, the peak value of said sawtooth voltage varying according to said distance between said first and second lines, means coupled to the output of said sawtooth generator means for producing a first direct output voltage varying according to the peak value of said sawtooth voltage, voltage divider means coupled to the output of said peak voltage producing means for receiving said first direct output voltage, said voltage divider means including a shaft means coupled thereto for controlling the amount of voltage division produced therein according to the angular position of said shaft, the angular position of said shaft corresponding to a predetermined position on said chart between said first and second lines, said voltage divider means producing a second direct output voltage whose magnitude is determined by the voltage division of said voltage divider means and corresponds to the distance between one of said first or second lines on said chart and said predetermined position on said chart between said first and second lines as measured along the line of scan, switching means coupled to the output of said sawtooth generator means and to said scanner and responsive to the coincidence of said linear sawtooth output voltage and said second recurrent center of scan pulses for producing a third direct output voltage equal to the instantaneous magnitude of said sawtooth voltage at the instants of occurrence of said center of scan pulses, the magnitude of said third direct output voltage corresponding to the distance between said one line on said chart and the center of scan of said scanner as measured along the line of scan, comparator means coupled to the output of said voltage divider means and to the output of said switching means and responsive to the difference between said second direct output voltage and said third direct output voltage for producing an error control voltage, and servo means coupled to said scanner and responsive to said error control voltage for automatically moving said scanner along a direction parallel to its direction of scan until the center of scan coincides with the predetermined position on said chart between said first and second lines as determined by the adjustment of said voltage divider means under the control of said shaft.

2. In a system for transversely scanning first and second lines on a chart, said system including a scanner producing first recurrent output pulses corresponding to the lines being scanned and further producing second recurrent output pulses whose time position occurs at the center of each scanning cycle, apparatus for producing an output voltage whose magnitude is proportional to the distance between one of said first or second lines on said chart and a position on said chart between said lines corresponding to the center of scan of said scanner, said distance being measured along the line of scan of said scanner, comprising in combination, means coupled to the output of said scanner and responsive to said first recurrent output pulses for producing a linear sawtooth output voltage, the peak value of said sawtooth voltage varying according to the distance between said first and second lines as measured along the line of scan, and electronic switching means coupled to the output of said sawtooth voltage producing means and to the output of said scanner and responsive to the coincidence of said sawtooth output voltage and said second recurrent center of scan pulses, said electronic switching means producing a direct output voltage equal to the instantaneous magnitude of said sawtooth voltage at the instants of occurrence of said center of scan pulses, the magnitude of said direct output voltage corresponding to said distance between one of said lines on said chart and the center of scan of said scanner.

3. Photo-responsive apparatus comprising in combination, a photoscanner for transversely scanning first and second uniformly illuminated lines on a chart at a constant scanning speed, said photoscanner producing first recurrent output pulses corresponding to the lines being scanned, the time between said recurrent output pulses varying according to the separation between said lines, said photoscanner further producing second recurrent output pulses whose time position occurs at the center of each scanning cycle, means for automatically moving said photoscanner in a direction parallel to its direction of scan for positioning the center of scan of said photoscanner relative to a predetermined position on said chart located between said first and second lines, said means including a sawtooth generator means coupled to said photoscanner and responsiver to said first recurrent pulses for producing a linear sawtooth output voltage, the peak value of said sawtooth voltage varying according to the separation between said first and second lines, means coupled to the output of said sawtooth generator means for producing a first direct output voltage varying according to the peak value of said sawtooth voltage, adjustable voltage divider means coupled to the output of said peak voltage producing means for receiving said first direct output voltage, said voltage divider means including means for adjusting the amount of voltage division produced therein, said adjustable voltage divider means producing a second direct output voltage whose magnitude is determined by the adjustment of said voltage divider means, the magnitude of said second direct output voltage corresponding to the spacing between one of said first or second lines and a predetermined position on said chart between said first and second lines, switching means coupled to the output of said sawtooth generator means and to said photoscanner and responsive to the coincidence of said linear sawtooth output voltage and said second recurrent center of scan pulses for producing a third direct output voltage equal to the instantaneous magnitude of said sawtooth voltage at the instants of occurrence of said center of scan pulses, the magnitude of said third direct output voltage corresponding to the spacing between said one line on said chart and the center of scan of said photoscanner, comparator means coupled to the output of said adjustable voltage divider means and to the output of said switching means and responsive to the difference between said second direct output voltage and said third direct output voltage for producing an error control voltage, and servo means coupled to said photoscanner and responsive to said error control voltage for automatically moving said photoscanner along its direction of scan until the center of scan coincides with the predetermined position on said chart between said first and second lines as determined by the adjustment of said voltage divider means.

4. In apparatus for transversely scanning first and second lines on a chart, said apparatus including a scanner recurrently scanning said first and second lines and producing first recurrent output pulses as said lines are being scanned, the time difference between said first recurrent output pulses varying according to the separation between said lines, said scanner further producing second recurrent output pulses whose time position occurs at the center of each scanning cycle, means for producing an output control voltage whose magnitude is determined by the difference between a position on said chart corresponding to the center of scan of said scanner system and a predetermined position on said chart located between said first and second lines, and whose polarity is determined by the direction of the center of scan of said scanner relative to said predetermined position on said chart, comprising in combination, a sawtooth generator means coupled to said scanner and responsive to said first recurrent output pulses for producing a linear sawtooth output voltage, the peak value of said sawtooth voltage varying according to the separation between said first and second lines, means coupled to the output of said sawtooth generator means for producing a first direct output voltage varying according to the peak value of said sawtooth voltage, adjustable voltage divider means coupled to the output of said peak voltage producing means and responsive to said peak voltage for producing a second direct output voltage whose magnitude corresponds to the spacing between one of said first or second lines and a predetermined position on said chart located between said first and second lines, switching means coupled to the output of said sawtooth generator means and to said scanner and responsive to the magnitude of said sawtooth output voltage at the instants of occurrence of each of said second recurrent center of scan pulses, said switching means producing a third direct output voltage equal to the instantaneous magnitude of said sawtooth voltage at the occurrence of each center of scan pulse, and means coupled to the output of said adjustable voltage divider means and said switching means for producing an output control voltage whose magnitude is determined by the difference between said second direct output voltage and said third direct output voltage, the magnitude of said output control voltage varying according to the difference between the center of scan of said scanner and said predetermined position.

5. Apparatus for automatically interpolating between first and second spaced lines on a chart comprising in combination, a scanner tranversely scanning said lines, said scanner producing first recurrent pulses corresponding to the lines being scanned, means coupled to said scanner and responsive to said first recurrent pulses for producing a first direct output voltage whose magnitude varies according to the distance between said first and second lines as measured along the line of scan, said scanner further producing second recurrent output pulses whose time position occurs at the center of each scanning cycle, adjustable voltage divider means coupled to the output of said means producing said first direct output voltage, means coupled to said adjustable voltage divider means for setting the amount of voltage division produced therein, said voltage divider means producing a second direct output voltage whose magnitude varies according to the distance between one of the lines on said chart and a predetermined position on said chart between said lines, said predetermined position being determined by the setting of said voltage divider means, means coupled to said scanner and responsive to said first recurrent pulses and said second recurrent center of scan pulses for producing a third direct output voltage whose magnitude varies according to the distance between said one line on said chart and the center of scan of said scanner as measured along the line of scan, and means responsive to the difference between said second and third direct voltages for controlling the relative position between the center of scan of said scanner and said predetermined position on said chart between said first and second lines.

6. Apparatus for automatically controlling the angular position of a shaft means in accordance with the position of the center of scan of a scanner, comprising in combination, a scanner transversely scanning first and second spaced lines on a chart and producing first recurrent pulses corresponding to the lines being scanned, means coupled to said scanner and responsive to said first recurrent pulses for producing a first direct output voltage whose magnitude varies according to the distance between said first and second lines as measured along the line of scan, said scanner further producing a second recurrent output pulse whose time position occurs at the center of each scanning cycle, voltage divider means coupled to the output of said means producing said first direct output voltage, shaft means coupled to said voltage divider means for setting the amount of voltage division produced therein according to the angular position of said shaft means, said voltage divider means producing a second direct output voltage whose magnitude varies according to the distance between one of the lines on said shaft and a predetermined position on said chart between said lines, means coupled to said scanner and responsive to said first recurrent pulses and said second recurrent center of scan pulses for producing a third direct output voltage whose magnitude varies according to the distance between said one line on said chart and the center of scan of said scanner as measured along the line of scan, and means responsive to the difference between said second and third direct voltages for controlling the angular position of said shaft means and setting said voltage divider so that said second direct voltage is substantially equal in magnitude to said third direct voltage, the angular position of said shaft means corresponding to the position of the center of scan of said scanner between said first and second lines.

7. Apparatus for automatically moving the position of a scanner with respect to a predetermined position located between first and second lines on a chart, said scanner transversely scanning said first and second lines and producing first recurrent output pulses corresponding to the lines being scanned, said scanner further producing second recurrent output pulses whose time position occurs at the center of each scanning cycle, comprising in combination, means coupled to said scanner and responsive to said first recurrent pulses for producing a linear sawtooth output voltage, means coupled to said sawtooth voltage producing means for producing a first direct output voltage whose magnitude varies according to the distance between said first and second lines as measured along the line of scan, adjustable voltage divider means coupled to the output of said means producing said first direct output voltage, means coupled to said adjustable voltage divider means for setting the amount of voltage division produced therein, said voltage divider means producing a second direct output voltage whose magniture varies according to the distance between one of the lines on said chart and a predetermined position on said chart between said lines, said predetermined position being determined by the setting of said voltage divider means, means coupled to the output of said voltage divider means and to said sawtooth voltage producing means, said means being further coupled to said scanner for receiving said second recurrent pulses, said means being responsive to the difference between the magnitude of said second direct output voltage and the magnitude of said sawtooth voltage at the instants of occurrence of said second recurrent center of scan pulses from said scanner for producing an error control output voltage, said error control output voltage varying in magnitude according to the distance between the predetermined position on said chart between said lines and the center of scan position of said scanner, and means responsive to said error control output voltage for controlling the position of said scanner relative to said predetermined position on said chart between said first and second lines.

8. A photoscanner comprising a phototube having a photosensitive cathode therein, a mask disposed opposite said photosensitive cathode, said mask having a narrow elongated slit therethrough for admitting light to said photosensitive cathode, a hollow cylindrical drum surrounding said phototube, said hollow cylindrical drum having an opening through the wall thereof in the form of a helical slit about the longitudinal axis of said drum, means coupled to said cylindrical drum for rotating said drum about its longitudinal axis, the longitudinal axis of said drum extending parallel to the narrow elongated slit in said mask, the helical slit in said rotating cylindrical drum and the elongated slit in said mask cooperating to admit a scanning beam of light upon said photosensitive cathode, and means affixed to said drum for producing an output signal whose time of occurrence corresponds to a predetermined point in the scanning cycle of said photoscanner.

9. A photoscanner comprising a phototube having a photosensitive cathode therein, a mask disposed adjacent said photosensitive cathode, said mask having a narrow elongated slit therethrough for admitting light to said photosensitive cathode, a hollow cylindrical drum surrounding said phototube and mask, said hollow cylindrical drum having an opening through the wall thereof in the form of a helical slit about the longitudinal axis of said drum, said means coupled to said cylindrical drum for rotating said drum about its longitudinal axis, the longitudinal axis of said drum extending parallel to the narrow elongated slit in said mask, the helical slit in said rotating cylindrical drum and the elongated slit in said mask cooperating to admit a scanning beam of light upon said photosensitive cathode, and means affixed to said drum for producing an output signal whose time of occurrence corresponds to the center of scan of said photoscanner.

10. Apparatus for automatically locating a photoscanner with respect to a chart representing an area to correspond with the position of a point with respect to said area, the position of said point with respect to said area being determined by its location relative to an arbitrary coordinate system fixed with respect to said area, said coordinate system comprising at least one set of nonintersecting lines, said chart being illuminated and having superimposed thereon a plurality of nonintersecting lines corresponding to said coordinate lines, said apparatus receiving an input signal representing a first ratio equal to the distance of said point from an adjacent coordinate line divided by the distance between the two coordinate lines adjacent said point, said photoscanner having photosensitive means for producing an output electrical signal in accordance with the amount of light received and a directive means for directing light received from an elemental area of the chart upon said photosensitive means, the orientation of the directive means being recurrently varied, whereby said photosensitive means receives light recurrently and successively from a series of contiguous elemental areas defining a locus transverse to said chart lines, and whereby the output signal of the photosensitive means consists of recurrent groups of first pulses corresponding to the chart lines, said groups being recurrent at the frequency of variation of the orientation of the directive means and the time between pulses of a group corresponding to the spacing of the chart lines along said locus, comprising in combination, a reference pulse generator for generating reference pulses recurrent at the frequency of variation of the orientation of the directive means, said reference pulses having a temporal relationship to the pulses of said groups corresponding to the location of the photoscanner with respect to the chart lines, a sawtooth generator coupled to the photoscanner and responsive to said first pulses for generating a linear sawtooth voltage wave, first sampling means coupled to the sawtooth generator and responsive to said sawtooth voltage wave for producing a first direct voltage having a magnitude equal to the peak magnitude of the individual sawtooth cycle generated during the interval between the pair of first pulses occurring immediately before and immediately after a reference pulse, proportioning means responsive to said input signal and coupled to the first sampling means for receiving said first direct voltage and for delivering a second direct voltage bearing a ratio to said first direct voltage equal to said first ratio, second sampling means for producing a third direct voltage equal to the instantaneous magnitude of a voltage wave received at a first input terminal when said second sampling means is triggered by a pulse applied to a second input terminal, said first input terminal being coupled to the sawtooth generator for receiving said sawtooth voltage wave, said second input terminal being coupled to the reference pulse generator for receiving said reference pulses, comparator means for producing an error control voltage corresponding to the difference between a pair of input direct voltages, said comparator means being coupled to the proportioning means and to the second sampling means to receive said second and third voltages, and servomechanism means coupled to the photoscanner and responsive to said error control voltage for automatically moving the photoscanner to decrease the magnitude of the error control voltage.

11. Apparatus for automatically locating a photoscanner with respect to a chart representing an area to correspond with the position of a craft with respect to said area, the position of said craft with respect to said area being determined by its location relative to an arbitrary coordinate system fixed with respect to said area, said coordinate system comprising at least one set of nonintersecting lines, said chart being illuminated and having superimposed thereon a plurality of nonintersecting lines corresponding to said coordinate lines, said apparatus receiving an input signal representing a first ratio equal to the distance of said craft from an adjacent coordinate line divided by the distance between the two coordinate lines adjacent said craft, said photoscanner having photosensitive means for producing an output electrical signal in accordance with the amount of light received and a directive means for directing light received from an elemental area of the chart upon said photosensitive means, the orientation of the directive means being recurrently varied, whereby said photosensitive means receives light recurrently and successively from a series of contiguous elemental areas defining a locus transverse to said chart lines, and whereby the output signal of the photosensitive means consists of recurrent groups of first pulses corresponding to the chart lines, said groups being recurrent at the frequency of variation of the orientation of the directive means and the time between pulses of a group corresponding to the spacing of the chart lines along said locus, comprising in combination, a reference pulse generator for generating reference pulses recurrent at the frequency of variation of the orientation of the directive means, said reference pulses having a temporal relationship to the pulses of said groups corresponding to the location of the photoscanner with respect to the chart lines, delay means coupled to said photoscanner for producing an output signal consisting of recurrent groups of second pulses corresponding to the chart lines, said second pulses lagging said first pulses by a time small compared to the time between any two successive first pulses, a sawtooth generator coupled to said delay means and responsive to said second pulses for generating a linear sawtooth voltage wave, a pulse selector means coupled to said photoscanner and to said reference pulse generator and responsive to said reference pulses for producing gating pulses simultaneously with the first pulses immediately following said reference pulses, first sampling means coupled to the sawtooth generator and to the pulse selector and responsive to said gating pulses for producing a first direct voltage having a magnitude equal to the peak magnitude of the individual sawtooth voltage cycle corresponding to said gating pulse, proportioning means responsive to said input signal and coupled to the first sampling means for receiving said first direct voltage and for delivering a second direct voltage bearing a ratio to said first direct voltage equal to said first ratio, second sampling means for producing a third direct voltage equal to the instantaneous magnitude of a voltage wave received at a first input terminal when said second sampling means is triggered by a pulse applied to a second input terminal, said first input terminal being coupled to the sawtooth generator for receiving said sawtooth voltage wave, said second input terminal being coupled to the reference pulse generator for receiving said reference pulses, comparator means for producing an error control voltage corresponding to the difference between a pair of input direct voltages, said comparator means being coupled to the proportioning means and to the second sampling means to receive said second and third voltages, and servomechanism means coupled to the photoscanner and responsive to said error control voltage for automatically moving the photoscanner to decrease the magnitude of the error control voltage.

12. Apparatus for automatically locating a photoscanner with respect to a chart representing an area to correspond with the position of a craft with respect to said area, the position of said craft with respect to said area being determined by its location relative to an arbitrary coordinate system fixed with respect to said area, said coordinate system comprising at least one set of non-intersecting lines, said chart being illuminated and having superimposed thereon a plurality of nonintersecting lines corresponding to said coordinate lines, said apparatus receiving an input signal representing a first ratio equal to the distance of said craft from an adjacent coordinate line divided by the distance between the two coordinate lines adjacent said craft, said photoscanner having photosensitive means for producing an output electrical signal in accordance with the amount of light received and a directive means for directing light received from an elemental area of the chart upon said photosensitive means, the orientation of the directive means being recurrently varied, whereby said photosensitive means receives light recurrently and successively from a series of contiguous elemental areas defining a locus transverse to said chart lines, and whereby the output signal of the photosensitive means consists of recurrent groups of first pulses corresponding to the chart lines, said groups being recurrent at the frequency of variation of the orientation of the directive means and the time between pulses of a group corresponding to the spacing of the chart lines along said locus, comprising in combination, a reference pulse generator for generating reference pulses recurrent at the frequency of variation of the orientation of the directive means, said reference pulses having a temporal relationship to the pulses of said groups corresponding to the location of the photoscanner with respect to the chart lines, a sawtooth generator coupled to the photoscanner and responsive to said first pulses for generating a linear sawtooth voltage wave, first sampling means coupled to the sawtooth generator and responsive to said sawtooth voltage wave for producing a first direct voltage having a magnitude equal to the peak magnitude of the individual sawtooth cycle generated during the interval between the pair of first pulses occurring immediately before and immediately after a reference pulse, voltage divider means coupled to said first sampling means for receiving said first direct voltage, said voltage divider means including a shaft for controlling the amount of voltage division produced therein according to the angular position of said shaft, the angular position of said shaft corresponding to said input signal, said voltage divider means producing a second direct voltage bearing a ratio to said first direct voltage equal to said first ratio, second sampling means for producing a third direct voltage equal to the instantaneous magnitude of a voltage wave received at a first input terminal when said second sampling means is triggered by a pulse applied to a second input terminal, said first input terminal being coupled to the sawtooth generator for receiving said sawtooth voltage wave, said second input terminal being coupled to the reference pulse generator for receiving said reference pulses, comparator means for producing an error control voltage corresponding to the difference between a pair of input direct voltages, said comparator means being coupled to the proportioning means and to the second sampling means to receive said second and third voltages, and servo-mechanism means coupled to the photoscanner and responsive to said error control voltage for automatically moving the photoscanner to decrease the magnitude of the error control voltage.

13. Apparatus for comparing the location of a photoscanner with respect to a chart representing an area to the position of a point with respect to said area, the position of said point with respect to said area being determined by its location relative to an arbitrary coordinate system fixed with respect to said area, said coordinate system comprising at least one set of lines, said chart being illuminated and having superimposed thereon a plurality of lines corresponding to said coordinate lines, said apparatus receiving an input signal representing a first ratio equal to the distance of said point from an adjacent coordinate line divided by the distance between the two coordinate lines adjacent said point, said photoscanner having photosensitive means for producing an output electrical signal in accordance with the amount of light received and a directive means for directing light received from an elemental area of the chart upon said photosensitive means, the orientation of the directive means being recurrently varied, whereby said photosensitive means receives light recurrently and successively from a series of contiguous elemental areas defining a locus transverse to said chart lines, and whereby the output signal of the photosensitive means consists of recurrent groups of first pulses corresponding to the chart lines, said groups being recurrent at the frequency of variation of the orientation of the directive means and the time between pulses of a group corresponding to the spacing of the chart lines along said locus, comprising in combination, a reference pulse generator for generating reference pulses recurrent at the frequency of variation of the orientation of the directive means, said reference pulses have a temporal relationship to the pulses of said groups corresponding to the location of the photoscanner with respect to the chart lines, means for producing a first direct voltage having a magnitude proportional to the distance between the pair of lines corresponding to the pair of first pulses occurring immediately before and immediately after a reference pulse, proportioning means coupled to receive said first direct voltage and responsive to said input signal for producing a second direct voltage bearing a ratio to said first direct voltage equal to said first ratio, means for producing a third direct voltage proportional to the position of said photoscanner with respect to said chart lines, and comparator means for producing an error voltage corresponding to the difference between a pair of received direct voltages, said comparator means being adapted to receive said second and third voltages.

14. Apparatus for automatically representing the position of a craft with respect to an area on a chart representing said area, the position of said craft with respect to said area being determined by its location relative to an arbitrary coordinate system fixed with respect to said area, said coordinate system comprising at least one set of non-intersecting lines, said chart being illuminated and having superimposed thereon a plurality of nonintersecting lines corresponding to said coordinate lines, said apparatus receiving an input signal representing a first ratio equal to the distance of said craft from an adjacent coordinate line divided by the distance between the two coordinate lines adjacent said craft, comprising a photoscanner having photosensitive means for producing an output electrical signal in accordance with the amount of light received and a directive means for directing light received from an elemental area of the chart upon said photosensitive means, the orientation of the directive means being recurrently varied, whereby said photosensitive means receives light recurrently and successively from a series of contiguous elemental areas defining a locus transverse to said chart lines, and whereby the output signal of the photosensitive means consists of recurrent groups of first pulses corresponding to the chart lines, said groups being recurrent at the frequency of variation of the orientation of the directive means and the time between pulses of a group corresponding to the spacing of the chart lines along said locus, a reference pulse generator for generating reference pulses recurrent at the frequency of variation of the orientation of the directive means, said reference pulses having a temporal relationship to the pulses of said groups corresponding to the location of the photoscanner with respect to the chart lines, a sawtooth generator coupled to the photoscanner and responsive to said first pulses for generating a linear sawtooth voltage wave, first sampling means coupled to the sawtooth generator and responsive to said sawtooth voltage wave for producing a first direct voltage having a magnitude equal to the peak magnitude of the individual sawtooth cycle generated during the interval between the pair of first pulses occurring immediately before and immediately after a reference pulse, proportioning means responsive to said input signal and coupled to the first sampling means for receiving said first direct voltage and for delivering a second direct voltage bearing a ratio to said first direct voltage equal to said first ratio, second sampling means for producing a third direct voltage equal to the instantaneous magnitude of a voltage wave received at a first input terminal when said second sampling means is triggered by a pulse applied to a second input terminal, said first input terminal being coupled to the sawtooth generator for receiving said sawtooth voltage wave, said second input terminal being coupled to the reference pulse generator for receiving said reference pulses, comparator means for producing an error control voltage corresponding to the difference between a pair of input direct voltages, said comparator means being coupled to the proportioning means and to the second sampling means to receive said second and third voltages, and servomechanism means coupled to the photoscanner and responsive to said error control voltage for automatically moving the photoscanner to decrease the magnitude of the error control voltage.

15. Apparatus for comparing the location of a scanning device with respect to a chart representing an area to the position of a point with respect to said area, the position of said point with respect to said area being determined by its location relative to an arbitrary coordinate system fixed with respect to said area, said coordinate system comprising at least one set of lines, said chart having superimposed thereon a plurality of lines corresponding to said coordinate lines, said apparatus receiving a first signal representing a first ratio equal to the distance of said point from an adjacent coordinate line divided by the distance between the two coordinate lines adjacent said point, comprising in combination, a scanning device adapted to periodically scan said chart along a path transverse to said chart lines and to produce an output signal consisting of recurrent groups of first pulses corresponding to said chart lines, said groups being recurrent at the periodic scanning rate of said scanning device and the time between pulses of a group corresponding to the spacing of the chart lines along said path, a reference pulse generator for generating reference pulses recurrent at said scanning rate and having a temporal relationship to the pulses of said groups corresponding to the relationship of the location of a reference point fixed with respect to said scanning device to said chart lines, means for producing a second signal representing the distance between the chart lines adjacent said reference point, means coupled to receive said second signal and responsive to said first signal for producing a third signal representing with respect to said second signal a ratio equal to said first ratio, means for producing a fourth signal representing the ratio between the distance of said reference point from an adjacent chart line to the distance between the pair of chart lines adjacent said reference point, and comparator means for producing an error signal corresponding to the difference between a pair of received signals, said comparator means being adapted to receive said third and fourth signals.

16. Apparatus for comparing the location of a scanning device with respect to a chart representing an area to the position of a point with respect to said area, the position of said point with respect to said area being determined by its location relative to an arbitrary coordinate system fixed with respect to said area, said coordinate system comprising at least one set of lines, said chart having superimposed thereon a plurality of lines corresponding to said coordinate lines, said apparatus receiving a first signal representing a first ratio equal to the distance of said point from an adjacent coordinate line divided by the distance between the two coordinate lines adjacent said point, comprising in combination, a scanning device adapted to periodically scan said chart along a path transverse to said chart lines and to produce an output signal consisting of recurrent groups of first pulses corresponding to said chart lines, said groups being recurrent at the periodic scanning rate of said scanning device and the time between pulses of a group corresponding to the spacing of the chart lines along said path, a reference pulse generator for generating reference pulses recurrent at said scanning rate and having a temporal relationship to the pulses of said groups corresponding to the relationship of the location of a reference point fixed with respect to said scanning device to said chart lines, means for producing a second signal representing the time between the first pulses occurring immediately before and immediately after a reference pulse, means coupled to receive said second signal and responsive to said first signal for producing a third signal representing with respect to said second signal a ratio equal to said first ratio, means for producing a fourth signal representing the ratio of the time between a reference pulse and the first pulse occurring immediately before said reference pulse to the time between said first pulses occurring immediately before and immediately after said reference pulse, and comparator means for producing an error signal corresponding to the difference between a pair of received signals, said comparator means being adapted to receive said third and fourth signals.

17. Apparatus for comparing the location of a scanning device with respect to a chart representing an area to the position of a point with respect to said area, the position of said point with respect to said area being determined by its location relative to an arbitrary coordinate system fixed with respect to said area, said coordinate system comprising at least one set of lines, said chart having superimposed thereon a plurality of lines corresponding to said coordinate lines, said apparatus receiving a first signal representing a first ratio equal to the distance of said point from an adjacent coordinate line divided by the distance between the two coordinate lines adjacent said point, comprising in combination, a scanning device adapted to periodically scan said chart along a path transverse to said chart lines and to produce an output signal consisting of recurrent groups of first pulses corresponding to said chart lines, said groups being recurrent at the periodic scanning rate of said scanning device and the time between pulses of a group corresponding to the spacing of the chart lines along said path, a reference pulse generator for generating reference pulses recurrent at said scanning rate and having a temporal relationship to the pulses of said groups corresponding to the relationship of the location of a reference point fixed with respect to said scanning device to said chart lines, means adapted to receive said output signal and responsive to said first signal for producing a second signal representing said first ratio, means adapted to receive said output signal and said reference pulses for producing a third signal representing the ratio between the distance of said reference point from an adjacent chart line to the distance between the pair of chart lines adjacent said reference point, and comparator means for producing an error signal corresponding to the difference between a pair of received signals, said comparator means being adapted to receive said second and third signals.

18. Apparatus for comparing the location of a first point with respect to a first line family to the location of a second point with respect to a second line family, said apparatus receiving a first signal representing a first ratio equal to the distance of said second point from an adjacent line of said second line family divided by the distance between the two lines of said second line family adjacent said second point, comprising in combination, means for producing a second signal representing the distance between the pair of lines of said first line family adjacent said first point, means coupled to receive said second signal and responsive to said first signal for producing a third signal representing with respect to said second signal a ratio equal to said first ratio, means for producing a fourth signal representing the ratio between the distance of said first point from an adjacent line of said first line family to the distance between the pair of lines of said first line family adjacent said first point, and comparator means for producing an error signal corresponding to the difference between a pair of received signals, said comparator means being adapted to receive said third and fourth signals.

19. Apparatus for comparing the location of a first point with respect to a first line family to the location of a second point with respect to a second line family, said apparatus receiving a first signal representing a first ratio equal to the distance of said second point from an adjacent line of said second line family divided by the distance between the two lines of said second line family adjacent said second point, comprising in combination, means for producing a second signal representing a second ratio equal to the distance of said first point from an adjacent line of said first line family divided by the distance between the two lines of said first line family adjacent said first point, and comparator means for producing an error signal corresponding to the difference between a pair of received signals, said comparator means being adapted to receive said first and second signals.

20. Apparatus for automatically locating a device with respect to a first line family to correspond with the location of a point with respect to a second line family, said apparatus receiving a first signal representing a first ratio equal to the distance of said point from an adjacent line of said second line family divided by the distance between the two lines of said second line family adjacent said point, comprising in combination, means for producing a second signal representing a second ratio equal to the distance of a reference point fixed with respect to said device from an adjacent line of said first line family divided by the distance between the two lines of said first line family adjacent said reference point, comparator means for producing an error signal corresponding to the difference between a pair of received signals, said comparator means being adapted to receive said first and second signals, and positioning means mechanically coupled to said device and responsive to said error signal for automatically moving said device to decrease the magnitude of said error signal.

References Cited in the file of this patent

UNITED STATES PATENTS

| | | |
|---|---|---|
| 2,371,963 | La Pierre | Mar. 20, 1945 |
| 2,489,305 | McLennan | Nov. 29, 1949 |

UNITED STATES PATENT OFFICE

CERTIFICATE OF CORRECTION

Patent No. 2,892,948                                                 June 30, 1959

Wilbert P. Frantz

It is hereby certified that error appears in the printed specification of the above numbered patent requiring correction and that the said Letters Patent should read as corrected below.

Column 4, line 40, for "magniutde" read -- magnitude --; column 8, line 16, for "responsiver" read -- responsive --; column 10, line 3, for "shaft" read -- chart --.

Signed and sealed this 29th day of March 1960.

(SEAL)
Attest:

KARL H. AXLINE
Attesting Officer

ROBERT C. WATSON
Commissioner of Patents